(12) United States Patent
Bland (10) Patent No.: US 8,813,417 B2
(45) Date of Patent: Aug. 26, 2014

(54) SURF FISHING TOY

(71) Applicant: Robert Bland, White Stone, VA (US)

(72) Inventor: Robert Bland, White Stone, VA (US)

(73) Assignee: Reel Surf Design LLC, White Stone, VA (US)

( * ) Notice: Subject to any disclaimer, the term of this patent is extended or adjusted under 35 U.S.C. 154(b) by 0 days.

(21) Appl. No.: 13/915,591

(22) Filed: Jun. 11, 2013

(65) Prior Publication Data

US 2014/0000147 A1 Jan. 2, 2014

Related U.S. Application Data (60) Provisional application No. 61/665,094, filed on Jun. 27, 2012.

(51) Int. Cl.
| | |
|---|---|
| A01K 85/00 | (2006.01) |
| A01K 91/08 | (2006.01) |
| A01K 91/02 | (2006.01) |
| A63H 23/10 | (2006.01) |

(52) U.S. Cl.
CPC .............. *A01K 85/00* (2013.01); *A01K 91/08* (2013.01); *A01K 91/02* (2013.01); *A63H 23/10* (2013.01)
USPC .............................. 43/42; 43/42.49; 446/154

(58) Field of Classification Search
USPC .................. 43/42, 42.49, 42.45; 446/154
See application file for complete search history.

(56) References Cited

U.S. PATENT DOCUMENTS

| | | | | |
|---|---|---|---|---|
| 1,773,973 | A | * | 8/1930 | Edgar .......................... 446/154 |
| 2,546,189 | A | | 2/1948 | Keep et al. |
| 2,633,659 | A | | 8/1949 | Baum |
| 2,674,065 | A | | 7/1952 | Sprinkle |
| 2,738,611 | A | * | 3/1956 | Miller ........................ 43/42.02 |
| 3,043,052 | A | | 3/1960 | Stanzel |
| 3,035,367 | A | * | 5/1962 | Troyer ........................ 43/42.16 |
| 3,193,967 | A | | 7/1965 | Okonski |
| 3,469,554 | A | | 9/1969 | Cole |
| 3,710,500 | A | | 1/1973 | Pena |
| 3,765,362 | A | | 10/1973 | Gitchel |
| 3,924,350 | A | | 12/1975 | Hsu |
| 4,048,751 | A | | 9/1977 | Muller-Seidel |
| 4,161,077 | A | * | 7/1979 | Ciaccio et al. ................. 43/26.1 |
| 4,270,307 | A | | 6/1981 | Arigaya |
| 4,442,621 | A | | 4/1984 | Kent |
| 4,635,391 | A | | 1/1987 | Early |
| 4,648,194 | A | | 3/1987 | Carroll, Jr. |
| 4,708,675 | A | | 11/1987 | Shoeffler et al. |
| 4,856,222 | A | | 8/1989 | Hannam |
| 4,923,427 | A | | 5/1990 | Roland |
| 5,077,929 | A | * | 1/1992 | Khan ............................. 43/26.1 |
| D324,706 | S | | 3/1992 | Gibson |
| 5,154,016 | A | * | 10/1992 | Fedora et al. ................. 43/26.1 |
| 5,203,729 | A | | 4/1993 | Beller et al. |

(Continued)

*Primary Examiner* — Christopher P Ellis
(74) *Attorney, Agent, or Firm* — Brian J. Teague (57) ABSTRACT

A water toy comprises an elongated buoyant body, a front attachment point, a weighted figurine, and a fin. The elongated buoyant body has a nose, a tail, a top surface, and a bottom surface. The top surface and the bottom surface meet at an outer edge. The front attachment point is disposed upon the bottom surface at the nose. The front attachment point comprises an aperture. The weighted figurine is disposed upon the top surface toward the nose. The fin extends from the bottom surface toward the tail. The water toy may comprise a rear attachment point for attaching a fish hook or lure and/or a water foil disposed upon the bottom surface at the tail.

22 Claims, 7 Drawing Sheets

(56) References Cited

U.S. PATENT DOCUMENTS

| | | |
|---|---|---|
| 5,385,501 A | 1/1995 | Fish |
| 5,581,932 A * | 12/1996 | Bell ............................ 43/26.1 |
| 5,806,232 A | 9/1998 | James |
| 5,947,788 A * | 9/1999 | Derrah ........................ 446/154 |
| D424,569 S | 5/2000 | Augusta |
| 6,068,531 A | 5/2000 | Patterson |
| 6,122,852 A | 9/2000 | Mechling, IV |
| 6,183,333 B1 | 2/2001 | Hall |
| 6,389,732 B1 * | 5/2002 | Daniel ............................ 43/4.5 |
| 6,402,578 B1 | 6/2002 | Zappitelli |
| 6,537,124 B2 | 3/2003 | Todokoro |
| 6,558,223 B1 | 5/2003 | Matthews |
| 6,579,146 B1 | 6/2003 | Ganz |
| 6,678,990 B2 | 1/2004 | Cox |
| 6,760,995 B2 * | 7/2004 | Mueller ........................ 43/26.2 |
| 6,793,552 B2 | 9/2004 | Derrah |
| 6,971,942 B2 | 12/2005 | Baker et al. |
| 7,055,280 B2 | 6/2006 | Shen et al. |
| 7,401,786 B2 | 7/2008 | Lochtefeld |
| 7,748,156 B2 | 7/2010 | Blum |
| 7,854,087 B1 | 12/2010 | Pervez |
| 2004/0121700 A1 * | 6/2004 | Derrah ........................ 446/154 |
| 2007/0028505 A1 | 2/2007 | Van Wyk et al. |
| 2008/0271357 A1 | 11/2008 | Easterby |

* cited by examiner

SURF FISHING TOY

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

I. Field

This invention relates to recreational devices and fishing apparatuses.

II. Background

Water toys are known to exist in a variety of designs, such as boats. Water toys may be controlled by radio wave, Bluetooth, or other wireless signal and may use a variety of methods of mechanical locomotion, such as an electric motor connected to propellers, rudders, or jets. However, accommodating such machinery within the structure of the water toy typically adds undesirable weight and requires undesirable modifications to the dimensions of the toy, undesirably impacting the hydrodynamic profile available of the toy. Further, machinery is prone to corrosion, which may result in the machinery becoming inoperable.

Surf fishing is a known recreational activity in which a fisher casts a lure into a body of water from the shore bordering that body of water, frequently where the waves of that body of water are breaking. However, there is a need for water toys which are compatible with surf fishing.

SUMMARY

The above problems, and others, are reduced by the surf fishing toy as herein described and shown.

In an embodiment, the present invention comprises a surf board with a top surface and a bottom surface. Affixed to the top surface is a figurine, which serves as a weight for buoyancy. Affixed to the bottom surface is a weighted fin, a front attachment point disposed toward the front of the surf board and a rear attachment point disposed toward the rear of the surf board. The front and rear attachment points are eye hooks comprising apertures. The rear attachment point is perpendicular to the front attachment point.

In an embodiment, the present invention comprises a surf board with a variety of hull designs, including a smooth hull, or a hull with one or more channels, wherein the channels run parallel to the length of the surf board.

In an embodiment, the present invention can be towed. The invention may comprise a front attachment point attached to, for example, a fishing line, which may be attached to, for example, a fishing rod. The user may then tow the invention by exerting a pulling force on the fishing line using the fishing rod, which is translated to the front attachment point, causing the invention to move within a body of water, such as into the face of a wave, or to a particular location, such as one in which the user believes there are fish.

In an embodiment, the present invention may be a water toy which can accommodate a fishing lure. The rear attachment point may be an eye hook which may attach to a fishing lure. A swivel may be attached between the fishing lure and the rear attachment point.

In an embodiment, the present invention may be towed by a line. The line may be attached to the front attachment point at one end. The line may be attached at an opposing end to, for example, a fishing rod and reel or a boat.

In an embodiment, the present invention may include a body comprising hydrodynamic and buoyancy features which enable it to remain atop the face of a crested wave as it breaks. Such features may include a rear attachment point which is perpendicular to the length of the body which may act as a water foil.

In an embodiment, the present invention may include a body contoured to mimic a traditional surf board, including features relating to the shape or contour of the tail or the hull design.

DETAILED DESCRIPTION

Figure 1A:
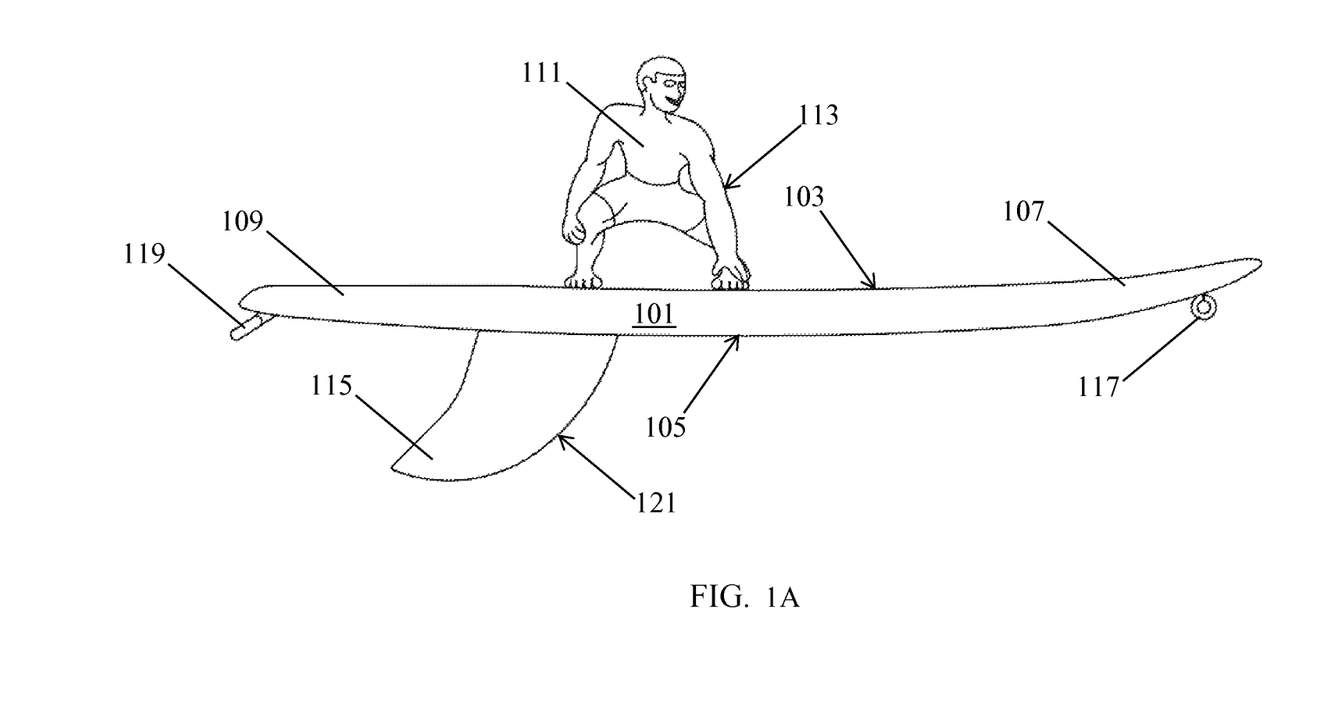
FIG. 1A is a side view of an embodiment of the present invention.

FIG. 1A is a side view depicting an embodiment of the present invention. The water toy comprises a body 101. The invention may be configured to float in a body of water or other fluid. In this application, water is used as an example of such a fluid but is not intended to be exclusive. In an embodiment, the body 101 is buoyant.

The body 101 has a top surface 103 and a bottom surface 105. The body 101 comprises a nose 107 at one end and a tail 109 at an opposing end. The invention is configured to travel along a longitudinal axis in a direction from the tail 109 to the nose 107, being the forward direction. The longitudinal axis runs parallel to the length of the body 101, from the nose 107 to the tail 109. The top surface 103 of the body 101 may be curved. In the depicted embodiment, the top surface 103 comprises a curve at the nose 107 of the body 101, the curve of the top surface 103 being concave, meaning that the top surface 103 curves away from the bottom surface 105 at the nose 107. In the depicted embodiment, the curve of the bottom surface 105 is convex at the nose 107 of the body 101, meaning that the bottom surface 105 curves toward the top surface 103 at the nose 107. The nose 107 rises slightly out of the water to expose the bottom surface 105 to the surface of the water, facilitating planing of the body 101 on the water's surface as the body 101 travels forward. This nose shape may be referred to as a rocker. The top surface 103 and the bottom surface 105 taper toward one another and meet at the opposing ends of the body 101.

Disposed upon the bottom surface 105 of the body 101 is a fin 115, a front attachment point 117, and a rear attachment point 119. The fin 115 may be comprised of plastic, metal, another material, or a combination of materials. The fin 115 has a known mass. The fin 115 is weighted to dispose the body 101 toward floating in a particular orientation, such as with the bottom surface 105 down relative to the surface of the water in which the invention floats. The fin 115 comprises a front edge 121, which is curved to reduce snagging obstacles struck by the fin 115 and body 101 as the body 101 moves along the longitudinal axis.

The front attachment point 117 comprises an aperture (e.g., an eye hook). The front attachment point 117 is disposed upon the bottom surface 105 toward the nose 107 of the body 101. The plane of the aperture of the front attachment point 117 may be parallel, perpendicular, or otherwise relative to the longitudinal axis. In the depicted embodiment, the plane of the aperture of the front attachment point 117 is parallel to the length of the body 101 and to the longitudinal axis.

The rear attachment point 119 comprises an aperture (e.g., an eye hook). The rear attachment point 119 is disposed upon the bottom surface 105 toward the tail 109 of the body 101. The plane of the aperture of the rear attachment point 119 may be parallel, perpendicular, or otherwise relative to the longitudinal axis. In the depicted embodiment, the plane of the aperture of the front attachment point 117 is perpendicular to the longitudinal axis. The aperture of the rear attachment point 119 may be occluded by a membrane (see FIG. 7 and accompanying description).

Disposed upon the top surface 103 is a figurine 111. The figurine 111 has a known mass and a known shape. The figurine 111 has a profile formed by edge 113. The profile of the figurine 111 is smoothed, thereby reducing the contours and features upon which a fishing line may snag. The figurine 111 may be postured to further smooth the profile and edge 113 of the figurine 111. The fin 115 and figurine 111 are counterweights against one another. The fin 115 may outweigh the figurine 111 in order to maintain a center of gravity at a point below the bottom surface 105 of the body 101.

The rear attachment point 119 creates hydrodynamic drag as the body 101 travels forward through the water, generating lift at the tail 109, thereby lowering the nose 107 of the body 101 relative to the surface of the water. It is understood that there may be additional methods or means of planing control or maintaining the position of the nose 107 as the body 101 travels forward. For example, the nose 107 may be more heavily weighted than the tail 109.

Figure 1B:
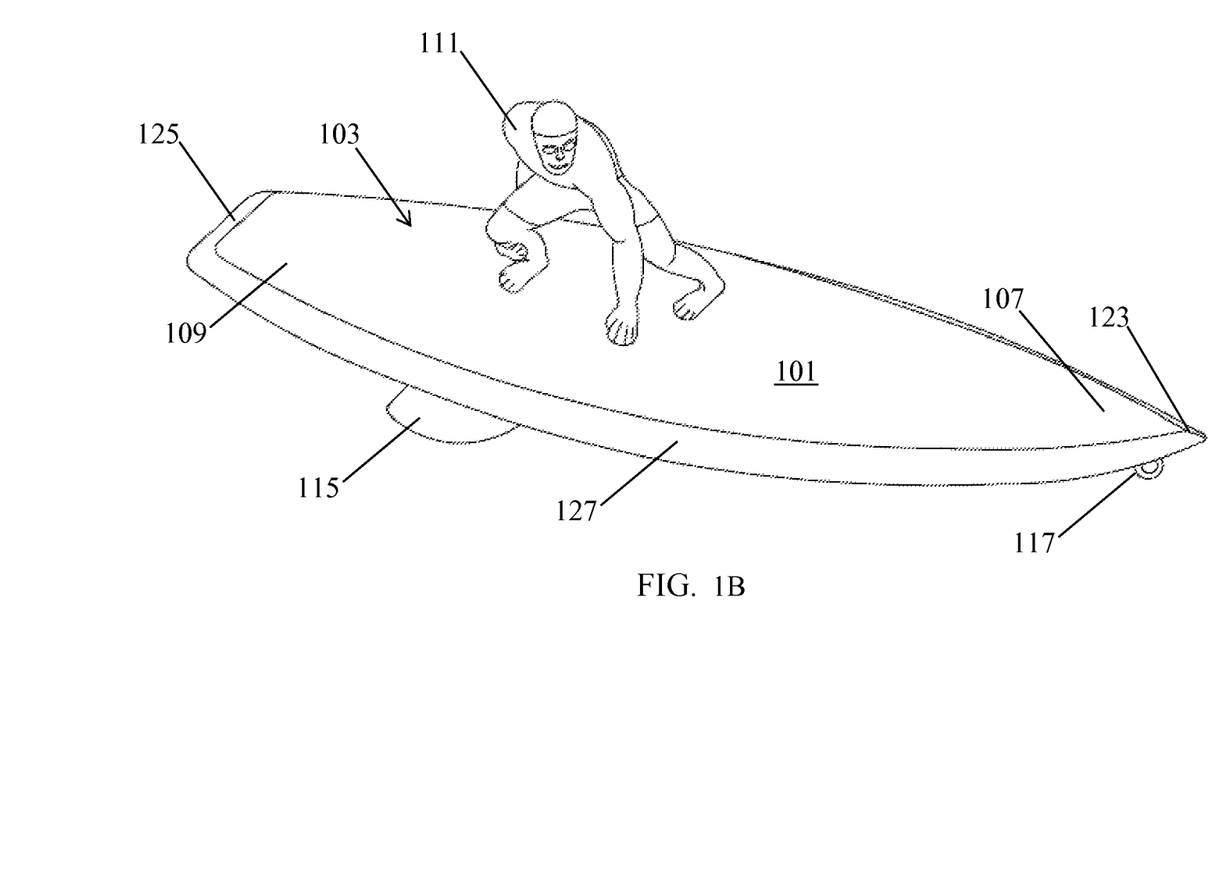
FIG. 1B is a perspective view of the embodiment of FIG. 1A.

FIG. 1B is a perspective view depicting the embodiment of FIG. 1A. The top surface 103 and the bottom surface 105 taper toward one another and meet at the opposing ends of the body 101. Toward the nose 107, the top surface 103 and the bottom surface 105 meet at the front tip 123. Toward the tail 109, the top surface 103 and the bottom surface 105 meet at the rear tip 125. The front tip 123 may come to a narrow point. The rear tip 125 may be truncated. The rails 127 run along the side edges of the body 101.

Figure 2:
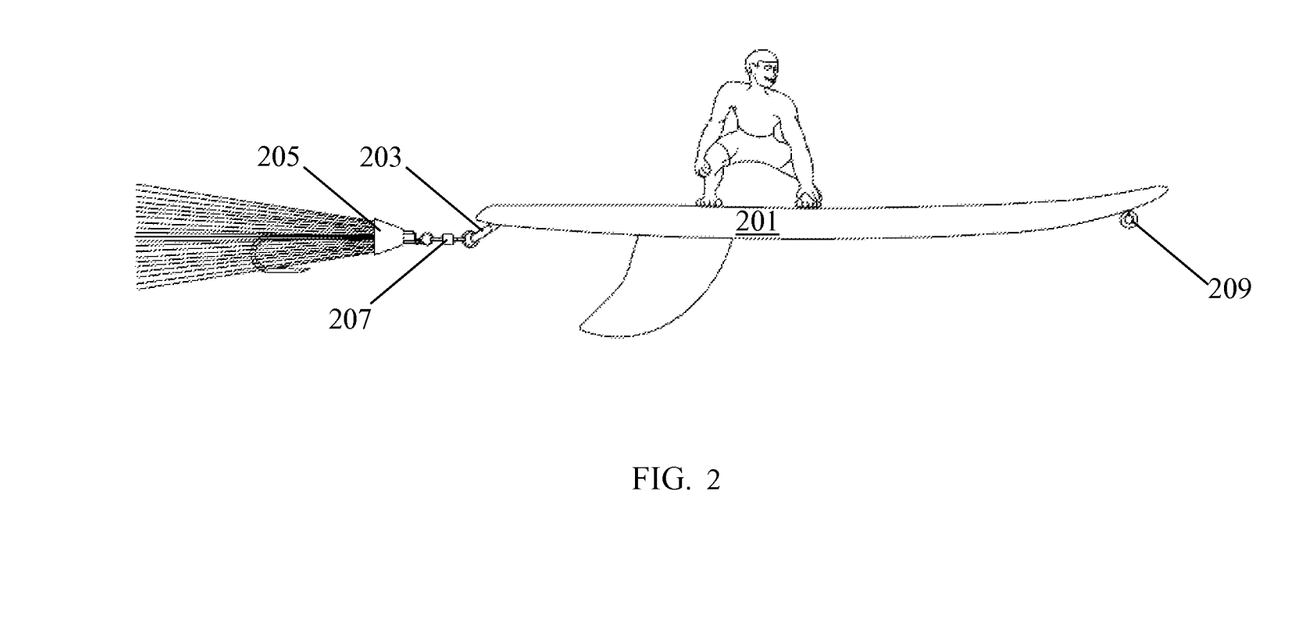
FIG. 2 is a side view of an embodiment of the present invention.

FIG. 2 is a perspective view depicting an embodiment of the present invention. The rear attachment point 203 may receive a fishing lure 205. The fishing lure 205 may be attached via a swivel 207. As the body 201 moves forward, the force of passing water may cause the fishing lure 205 to re-orient or rotate relative to the body 201. The swivel 207 allows the fishing lure 205 to rotate relative to the body 201, enabling the fishing lure 205 and the body 201 to orient independently of one another, reducing the hydrodynamic impact of one on the other.

The body 201 may be moved forward by the exertion of pulling force on the front attachment point 209, which the body 201 translates to the fishing lure 205 via the rear attachment point 203 and the swivel 207. In this way, the body 201 may be disposed upon a fishing line in between a length of fishing line and a fishing lure 205. The fishing lure 205 may be attached directly to the rear attachment point 203 or may be spaced therefrom by, for example, a swivel 207 or by a length of fishing line.

The body 201 is buoyant, but will be pulled underneath the surface of the water if a fish bites an attached fishing lure 205, regardless of whether the body 201 is moving forward at the time. Thus, the body 201 can visually indicate that a fish has bit the fishing lure 205.

Figure 3:
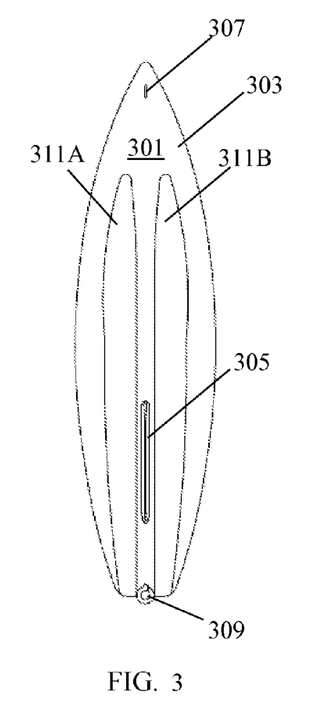
FIG. 3 is a bottom view of an aspect of the present invention.

FIG. 3 is a bottom view depicting an aspect of the present invention. The body 301 has a bottom surface 303, which comprises a fin 305, a front attachment point 307, and a rear attachment point 309. In the depicted embodiment, the bottom surface 303 further comprises two channels 311A and 311B. The channels 311A and 311B comprise grooves in the body 301. The channels 311A and 311B channel and redirect water as the body 301 moves forward.

Figure 4:
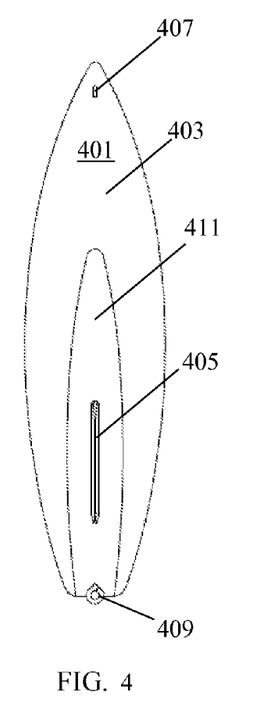
FIG. 4 is a bottom view of an aspect of the present invention.

FIG. 4 is a bottom view depicting an aspect of the present invention. The body 401 has a bottom surface 403. The bottom surface 403 comprises a fin 405, a front attachment point 407, and a rear attachment point 409. In the depicted embodiment, the bottom surface 403 further comprises one channel 411. The channel 411 comprises grooves in the body 401. The channel 411 channels and redirects water as the body 401 moves forward.

Figure 5:
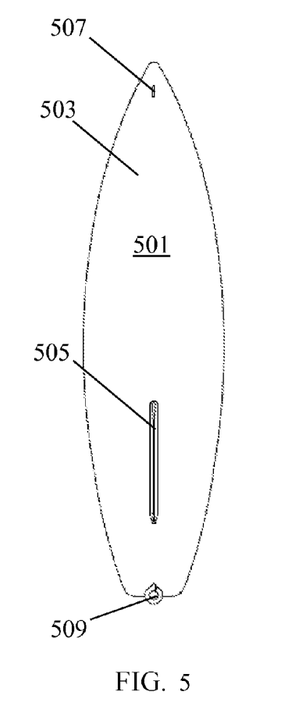
FIG. 5 is a bottom view of an aspect of the present invention.

FIG. 5 is a bottom view depicting an aspect of the present invention. The body 501 has a bottom surface 503. The bottom surface 503 comprises a fin 505, a front attachment point 507, and a rear attachment point 509. In the depicted embodiment, the bottom surface 503 is flat and comprises zero channels to redirect water as the body 501 moves forward.

Figure 6:
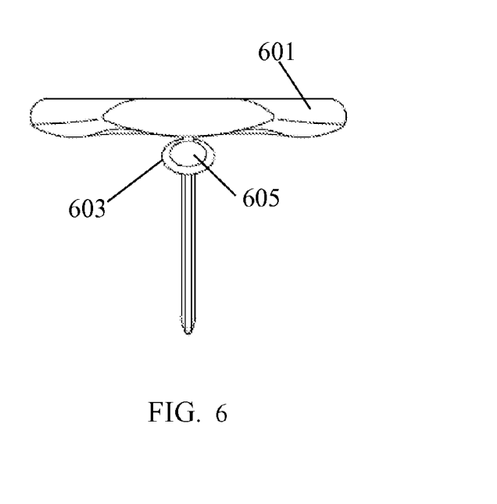
FIG. 6 is a rear view of an aspect of the present invention.

FIG. 6 is a rear view depicting an aspect of the present invention. The depicted aspect includes a rear attachment point. In particular, a body 601 comprises an annular frame 603 and an occluding membrane 605. The annular frame 603 may be formed by, for example, an eye hook. The occluding membrane 605 may be, for example, a film of latex, adhesive, or ethyl cyanoacrylate. The occluding membrane 605 fully occludes the annular frame 603, but can be pierced by a piercing object, such as, for example, a swivel. The piercing object partially occludes the annular frame 603 and the occluding membrane 605 remains intact aside from the puncture made by the piercing object. Thus, the annular frame 603 remains substantially occluded by either the piercing object or the occluding membrane 605. The annular frame 603 and occluding membrane 605 together create hydrodynamic drag and lift as the body 601 moves forward, enabling the body 601 to plane on the surface of the water.

Figure 7:
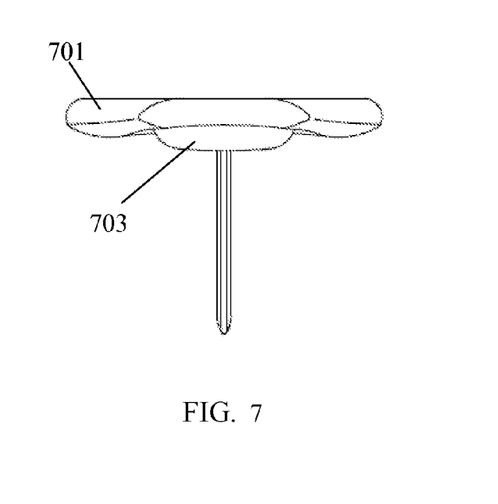
FIG. 7 is a rear view of an aspect of the present invention.

FIG. 7 is a rear view depicting an aspect of the present invention. The depicted aspect includes a body 701 comprising a solid water foil 703. The solid water foil 703 creates hydrodynamic drag and lift as the body moves forward to enable the body to plane on the surface of the water. The solid water foil 703 is a flap, fin, or lip on the rear edge of the body. The solid water foil 703 does not comprise an aperture or attachment point.

Figure 8:
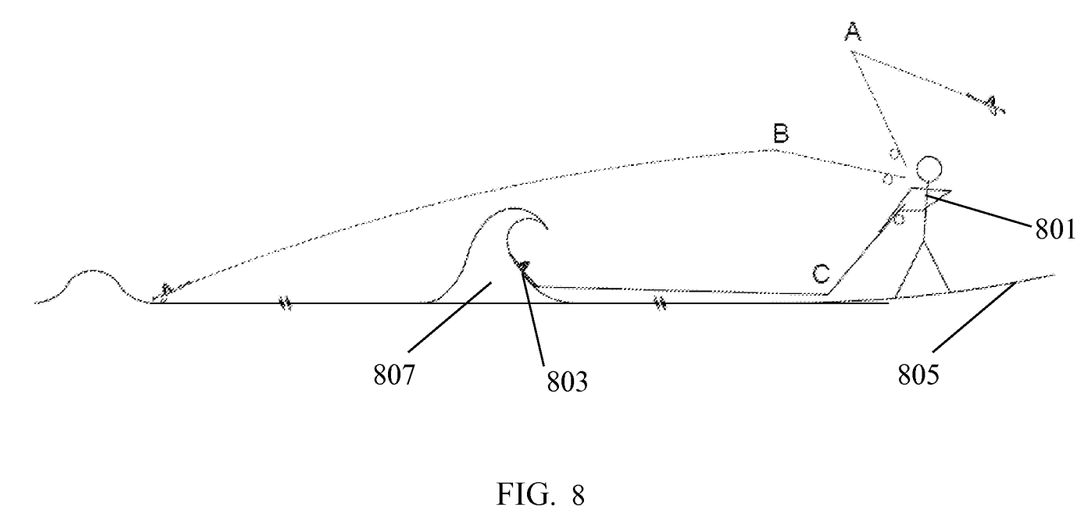
FIG. 8 is a diagram of an embodiment of the present invention.

FIG. 8 is a diagram depicting a method of use which begins with a user 801 at a shore 805 of a body of water where waves 807 are breaking, such as an ocean shore. The user 801 attaches one end of a fishing line to the surf toy 803, with the other end being operably connected to a fishing rod and reel. The user 801 then moves the fishing rod and reel from Alternate Position A through Alternate Position B, casting the surf toy 803 past a line of waves 807. The user 801 then operates the rod and reel to reel in the surf toy 803 through the waves 807 toward Alternate Position C. The user 801 may control the speed and direction of travel of the surf toy 803 using the fishing rod and reel. The user 801 may control the movement of the surf toy 803 relative to the waves 807 to make the surf toy 803 "surf" or "ride" an incoming wave. The user may simultaneously surf fish with the surf toy 803 by attaching a fishing lure to a rear attachment point of the surf toy 803.

Figure 9:
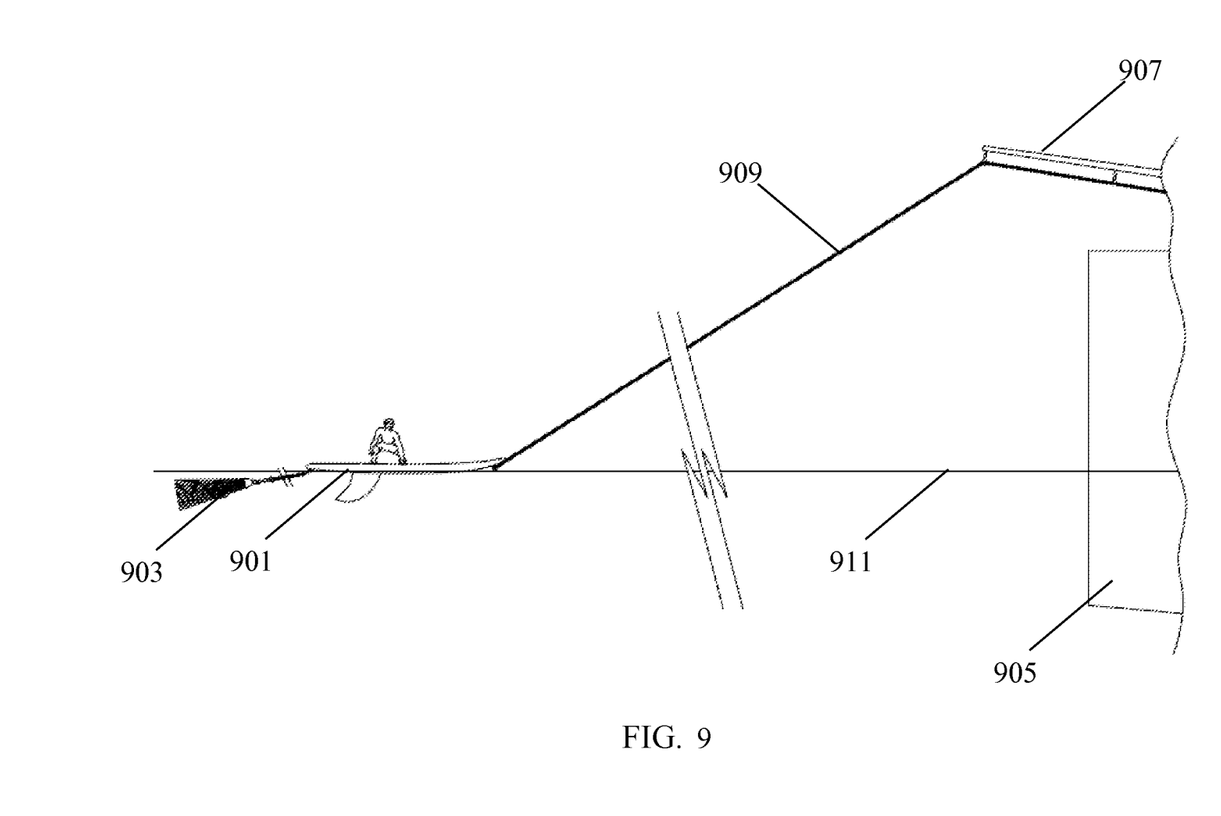
FIG. 9 is a diagram of an embodiment of the present invention.

FIG. 9 is a diagram depicting an embodiment of the present invention in which the surf toy 901 is towed by a boat 905. A fishing lure 903 is attached to a rear attachment point of the surf toy 901. A tow line 909 is attached to the front attachment point of the surf toy 901 at one end of the tow line 909 and is operably connected to a tow rod 907 at the other end of the tow line 909. The tow rod 907 is attached to the boat 905. The boat trawls the surf toy 901 and attached fishing lure 903. The surf toy 901 planes on the surface of the water 911 and tows the fishing lure 903. The passengers of the boat 905 can monitor the fishing lure 903 by observing the surf toy 901, which will give a visual indication if a fish bites the fishing lure 903, such as by submerging below the surface of the water 901. The fishing lure 903 may be separated from the surf toy 901 by a length of fishing line or may be attached directly to the surf toy 901.

Other systems, methods, and/or products according to the above embodiments will be or will become apparent to one of ordinary skill in the art upon review of the above description, the following drawings, and any further description. It is intended that all such additional systems, methods, and/or products be included within this description, be within the scope of the present invention, and be protected by the accompanying claims.

What is claimed is:

1. A water toy, comprising:
   an elongated buoyant body having a nose, a tail, a top surface, and a bottom surface, wherein the top surface and the bottom surface meet at an outer edge;
   a front attachment point disposed upon the bottom surface at the nose, wherein the front attachment point defines an aperture;
   a water foil projecting downward from the tail or from the bottom surface at the tail, wherein the water foil creates hydrodynamic drag and lift as the water toy moves forward in water; and
   a fin extending from the bottom surface.

2. The water toy of claim 1, wherein:
   the aperture of the front attachment point is parallel to a length of the elongated buoyant body.

3. The water toy of claim 1, further comprising:
   a rear attachment point disposed upon the bottom surface at the tail.

4. The water toy of claim 3, wherein:
   the rear attachment point defines an aperture.

5. The water toy of claim 4, wherein:
   the aperture of the rear attachment point is perpendicular to a length of the elongated buoyant body.

6. The water toy of claim 4, wherein:
   the water foil comprises a rear attachment point, wherein the rear attachment point comprises an annular frame that defines the aperture and a membrane, the membrane coating the annular frame.

7. The water toy of claim 6, wherein:
   the annular frame is perpendicular to a length of the elongated buoyant body and angled toward the tail.

8. The water toy of claim 3, further comprising:
   a fishing lure attached to the rear attachment point.

9. A method of using a water toy, comprising:
   receiving a pulling force at a front attachment point disposed upon a bottom surface at a nose end of an elongated body;
   translating the pulling force through the elongated body to a rear attachment point disposed upon a tail end of the elongated body;
   exerting a pulling force on a fishing lure attached to the rear attachment point;
   generating a downward force on the nose end by obstructing flowing water at the rear attachment point.

10. The water toy of claim 1, wherein the fin extends from the bottom surface toward the tail.

11. The water toy of claim 1, further comprising:
    a figurine disposed upon the top surface.

12. A water toy, comprising:
    an elongated buoyant body having a nose, a tail, a top surface, and a bottom surface, wherein the top surface and the bottom surface meet at an outer edge;
    a front attachment point disposed upon the bottom surface at the nose, wherein the front attachment point defines an aperture;
    a rear attachment point disposed upon the bottom surface at the tail, wherein the rear attachment point defines an aperture; and
    a fin extending from the bottom surface.

13. The water toy of claim 12, wherein:
    the aperture of the front attachment point is parallel to a length of the elongated buoyant body.

14. The water toy of claim 12, wherein:
    the aperture of the rear attachment point is perpendicular to a length of the elongated buoyant body and angled toward the tail.

15. The water toy of claim 12, wherein:
    the rear attachment point comprises an annular frame that defines the aperture and a membrane, the membrane coating the annular frame.

16. The water toy of claim 15, wherein:
    the annular frame is perpendicular to a length of the elongated buoyant body and angled toward the tail.

17. The water toy of claim 12, further comprising:
    a fishing lure attached to the rear attachment point.

18. The water toy of claim 12, wherein the fin extends from the bottom surface toward the tail.

19. The water toy of claim 12, further comprising:
    a water foil projecting downward from the tail or from the bottom surface at the tail, wherein the water foil creates hydrodynamic drag and lift as the water toy moves forward in water.

20. The water toy of claim 12, further comprising:
    a figurine disposed upon the top surface.

21. The water toy of claim 1, wherein the fin comprises a weighted fin.

22. The water toy of claim 12, wherein the fin comprises a weighted fin.

* * * * *